US011835676B2

(12) United States Patent
Tremsin

(10) Patent No.: US 11,835,676 B2
(45) Date of Patent: Dec. 5, 2023

(54) EARLY-WARNING FIRE DETECTION SYSTEM BASED ON A MULTIVARIABLE APPROACH

(71) Applicant: Vasily Antonovich Tremsin, Lafayette, CA (US)

(72) Inventor: Vasily Antonovich Tremsin, Lafayette, CA (US)

( * ) Notice: Subject to any disclaimer, the term of this patent is extended or adjusted under 35 U.S.C. 154(b) by 100 days.

(21) Appl. No.: 16/403,595

(22) Filed: May 5, 2019

(65) Prior Publication Data

US 2020/0348446 A1    Nov. 5, 2020

(51) Int. Cl.
| | | |
|---|---|---|
| *G01W 1/02* | (2006.01) | |
| *G01V 8/10* | (2006.01) | |
| *G01V 8/00* | (2006.01) | |
| *G06T 7/00* | (2017.01) | |
| *H04N 23/90* | (2023.01) | |

(52) U.S. Cl.
CPC .............. *G01W 1/02* (2013.01); *G01V 8/005* (2013.01); *G01V 8/10* (2013.01); *G06T 7/0002* (2013.01); *H04N 23/90* (2023.01); *G06T 2207/10024* (2013.01); *G06T 2207/10048* (2013.01); *G06T 2207/20084* (2013.01); *G06T 2207/30192* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 5,289,275 | A * | 2/1994 | Ishii | ................... G06K 9/00362 |
| | | | | 340/578 |
| 9,643,722 | B1 * | 5/2017 | Myslinski | .............. H04N 7/183 |
| 10,042,086 | B1 * | 8/2018 | Smalley | ................. G01J 5/089 |
| 2014/0099020 | A1 * | 4/2014 | Ko | ..................... G06K 9/00664 |
| | | | | 382/159 |
| 2016/0149657 | A1 * | 5/2016 | Kurihara | ............... H04H 20/59 |
| | | | | 340/539.18 |
| 2017/0116836 | A1 * | 4/2017 | Park | ...................... G08B 13/19 |
| 2019/0026538 | A1 * | 1/2019 | Wang | ........................ G06T 7/20 |
| 2019/0154871 | A1 * | 5/2019 | Leduc | .................. B64C 39/024 |
| 2019/0282307 | A1 * | 9/2019 | Azizian | .................. A61B 34/20 |
| 2019/0304272 | A1 * | 10/2019 | Fang | ................ G08B 13/19613 |
| 2019/0318598 | A1 * | 10/2019 | Aponte Luis | ......... H04W 4/021 |
| 2020/0128216 | A1 * | 4/2020 | Siddiqui | ............... H04N 9/646 |
| 2021/0073692 | A1 * | 3/2021 | Saha | ..................... G06Q 40/08 |

* cited by examiner

*Primary Examiner* — Shawn S An

(57) ABSTRACT

An automated fire detection system includes a distributed network of standalone sensor units having multifunctional capability to detect wildfires at their earliest stage. Multiple modes of verification are employed, including thermal imaging, spectral analysis, near infrared and long-wave infrared measurements, measurements of the presence and/or concentration of smoke, and sensing local temperature and humidity and wind speed and direction. A dedicated algorithm receives all data from the network and determines the location of flames from the imaging sensors, combined with the smoke, temperature, humidity, and wind measurements at every dispersed device.

10 Claims, 10 Drawing Sheets

Fire Location Reconstruction from Smoke Measurement

Image 1
(at the emission spectral line)

Image 2
(near the emission line)

Processed image
only the flames are seen (c)    Sun: $V_{NIR}/V_{Vis} < 1$;    Fire: $V_{NIR}/V_{Vis} > 1$

Fire Location Reconstruction from Smoke Measurement

EARLY-WARNING FIRE DETECTION SYSTEM BASED ON A MULTIVARIABLE APPROACH

CROSS-REFERENCE TO RELATED APPLICATIONS

This application claims the benefit of the priority filing date of U.S. Provision Application 62/667,422, filed May 5, 2018.

BACKGROUND OF THE INVENTION

The present invention is in the technical field of wildfire and other fire detection. More particularly, the present invention is in the technical field of automatic detection of fires using a network of devices.

Despite groundbreaking technological progress and scientific advancements, fires remain a crucial problem in today's communities all around the world. Many existing methods for wildfire detection such as satellite imaging, aerial infrared photography and infrared imaging by stationary cameras at certain lookout points scan very large areas of land, but cannot detect flames at early stages unless in a direct line of sight. These stationary surveillance methods are sparsely implemented, so only cover a small fraction of the area which needed to be monitored. The aerial methods are only implemented when a vehicle is flying in the air. Satellite based imaging only covers very large areas, but does not automatically detect fires when they are at early stages of development, unless they are directed to scanning a very specific small area. Beyond these limitations, advanced monitoring cameras cost tens of thousands of dollars—preventing their wide spread use to cover very wide areas, and sometimes these cameras fail in non-ideal weather scenarios: leaving broad areas unprotected.

BRIEF SUMMARY OF THE INVENTION

The present invention is an affordable multivariable system for real-time prompt detection of fires, including wildfires, that would allow firefighters to combat flames before they grow into deadly infernos. The present system consists of a dispersed network of devices that wirelessly communicate to provide comprehensive, real-time monitoring of the area. To evade false positives, multiple stages of verification are employed, using a variety of characteristics specific to fires. Multivariable detection is based on a combination of long-wave infrared thermal imaging, near infrared narrow-band imaging, analysis of gases, such as smoke, and implementing spectral analysis of radiation around the sensor, as well as monitoring environmental parameters such as temperature, humidity and wind direction. Once a possible fire is detected by the sensor, the final verification is performed by a dedicated artificial intelligence method. This multivariable verification approach based on a combination of readings from a set of inexpensive sensors allows rejection of many false positives. Environmental factors such as wind, temperature and humidity variation are used to increase the accuracy of reading by inexpensive sensors in real time. A dedicated algorithm is used to reconstruct the location of smoke-producing flames even if the flames are not in a direct field of view. This is performed by using real-time measurements on gas concentration, temperature and wind direction from all devices dispersed throughout the area adjacent to the fire. The novel, affordable method of early wildfire detection provided by this unique system allows firefighters to contain early wildfires. Furthermore, the present system can be used in conjunction with the existing monitoring systems, such as satellite networks and other fire detection networks. Thus, the distributed system can save billions of dollars in fire damage and prevent future wildfire-related fatalities, all at a fraction of the cost of existing wildfire detection methods.

- Electromagnetic radiation (visible, near infrared, and long wave infrared wavelength ranges) is used to detect the possible presence of fires.
- Heat generated by the fires can be detected by the thermal imaging camera or by the non-imaging temperature sensor.
- Gas signatures of active fires, in the form of increased concentration of specific gases (such as smoke) is sensed by the gas sensors implemented in the unit (such as, but not limited to inexpensive MQ-type sensors).

The detection of multiple fire characteristics in one unit is used in order to reduce false positive signals. Combination of all these characteristic signals allows a low cost system to operate reliably.

Figure 3:
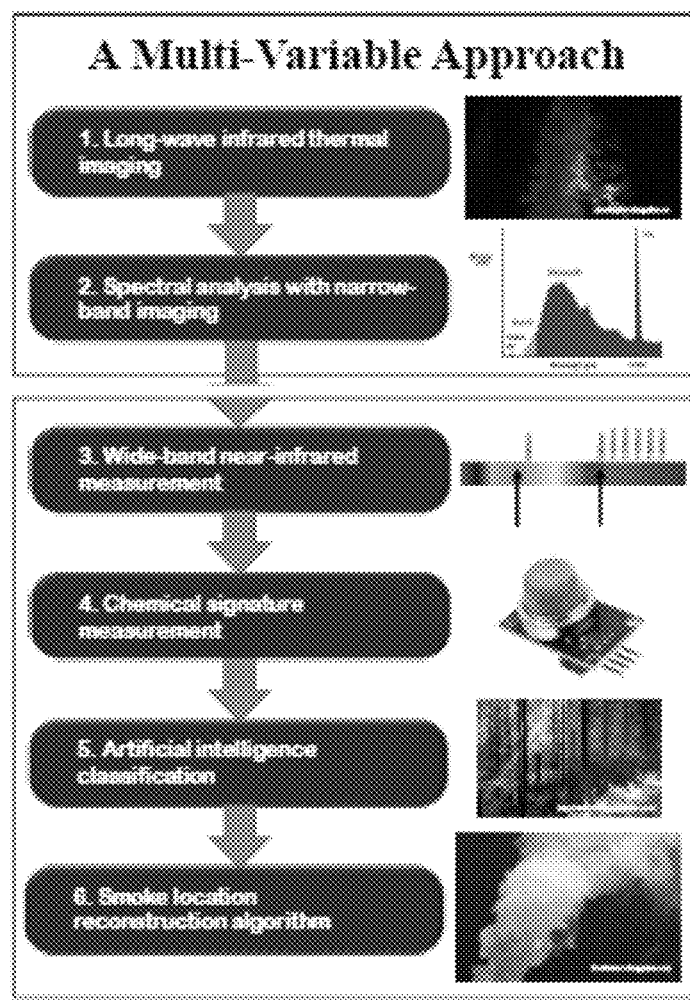

FIG. 3. Multivariable approach to wildfire detection used in present invention. Multiple fire detection approaches are used simultaneously to detect fires (including wildfires) and to exclude false positives.

Figure 4:
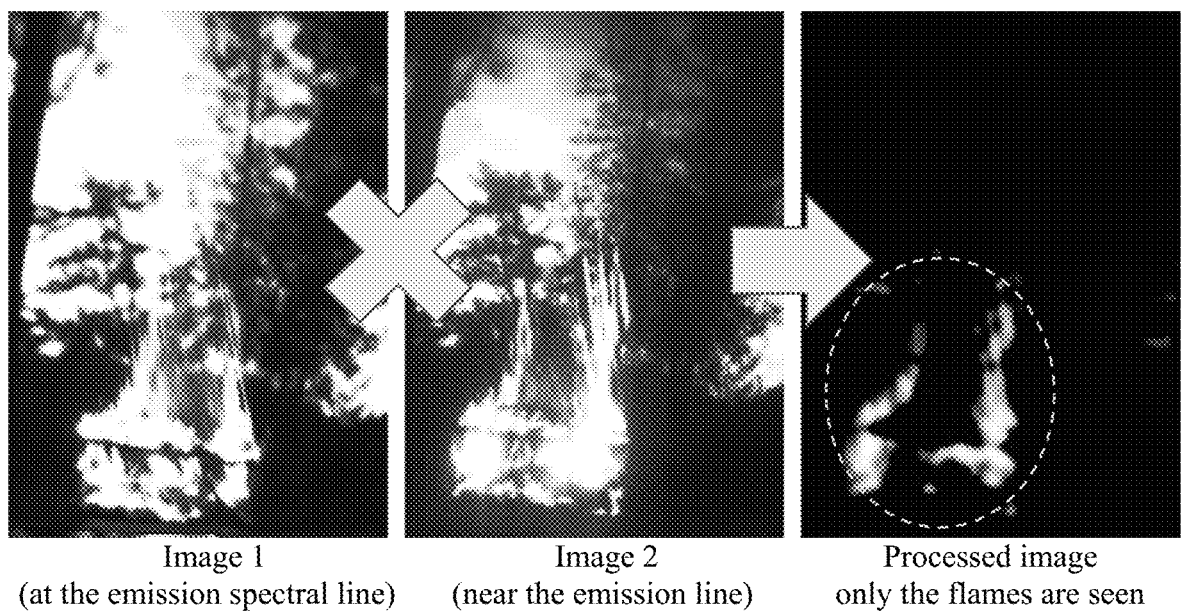
Figure 5:
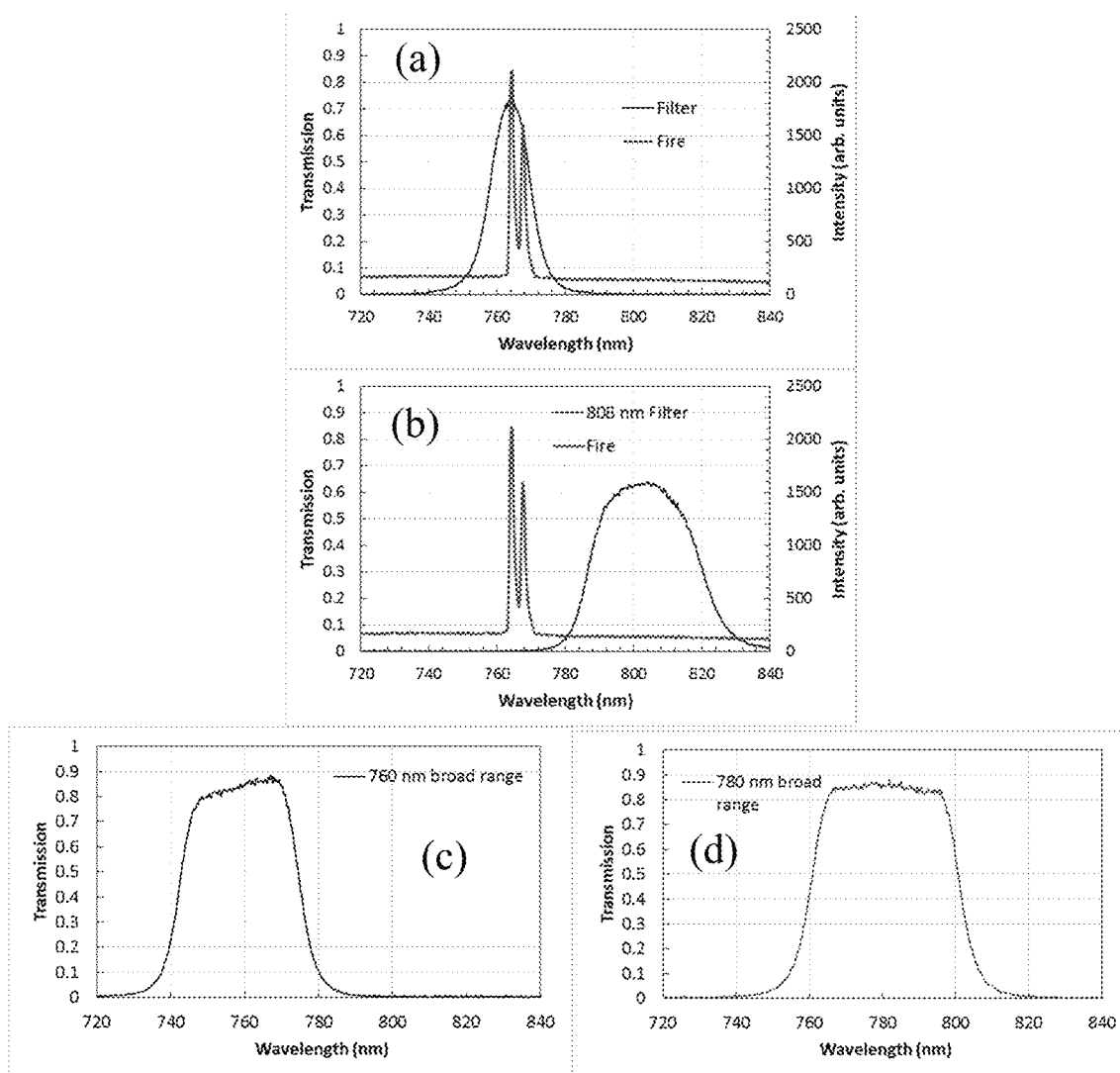

FIG. 4. Two narrow-band images acquired at wavelengths near unique spectral features of fire (e.g. K emission lines or others) and a processed image. Two narrow-bandpass filters (which can be formed by a combination of broad bandpass filters, as shown in FIGS. 5.*c* and 5.*d*) are installed on two cameras: one covering emission spectral line(s) and the other next to emission line(s). The images from two cameras are normalized to the same intensity and field of view as described in the detailed description of the invention, and then subtracted or divided in order to obtain the image of active flames only (all pixels with no flame are eliminated by this procedure). The processed image illustrates only pixels with active flames are seen (within the dashed oval area on the resulting image shown on the right).

FIG. 5. Emission spectra ranges imaged by two cameras (or by one camera with exchangeable spectral filter). One image is taken at the fire-specific emission lines, while another image is taken at the wavelength range next to it, as shown in FIGS. 5.*a* and 5.*b*. The narrow band filter can be formed by a combination of two or more wide band filters, as shown in FIGS. 5.*c* and 5.*d*.

Figure 6:
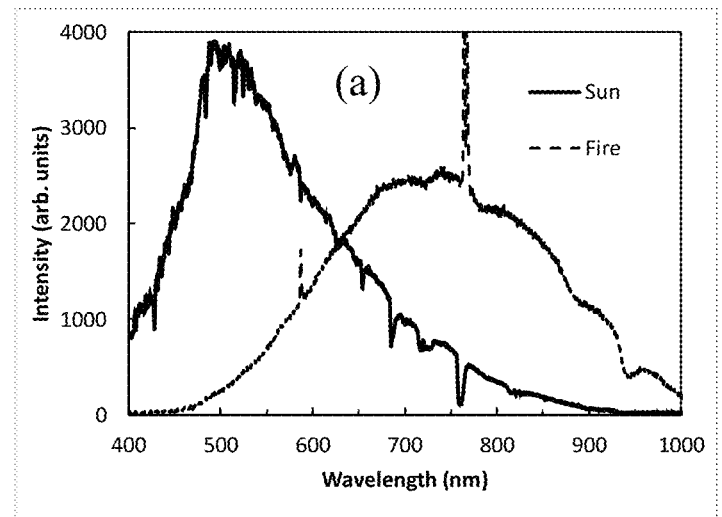
Figure 6:
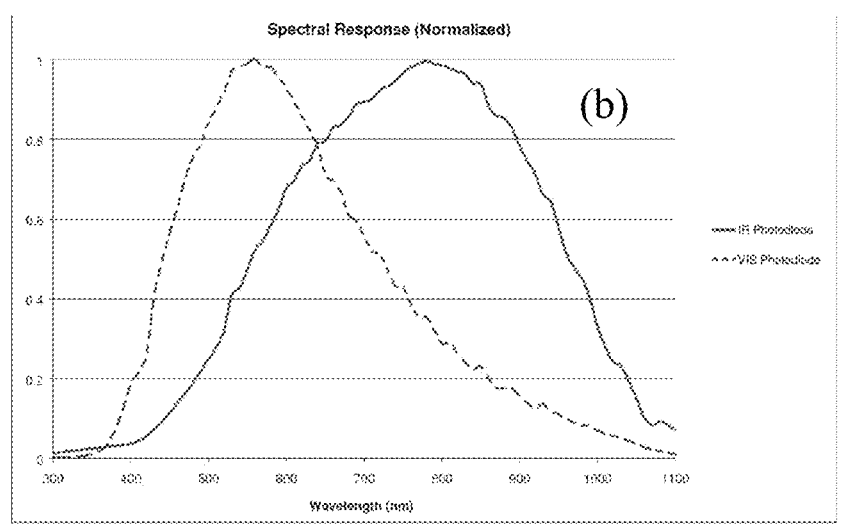

FIG. 6. An example of how two broadband imaging or diode detection is used to differentiate the fire emission spectrum from the natural (e.g. sun) and man-made light sources. FIG. 6.*a* shows two emission spectra: of the Sun (measured at the ground) and of a wood-burning fire. The fire spectrum is shifted towards longer wavelengths. FIG. 6.*b*. shows spectral sensitivity of two photodiodes, which can be used in the measurement used in the sensor. Two wavelength ranges are shifted relative to each other. FIG. 6.*c* shows the criteria of fire detection: for regular light sources, the ratio of diode readings (normalized by their sensitivity) is lower compared to the same ratio for the emission from an active fire.

Figure 7:
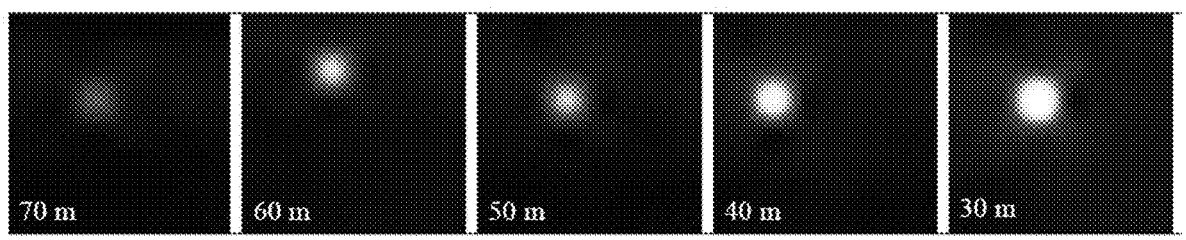

FIG. 7. An example of images obtained by the thermal infrared imaging camera at various distances to a small (~50×50 cm$^2$) wood burning fire (8×8 pixel in the current implementation, but can be more pixels if other thermal imaging inexpensive sensors are available). The pixels above background are seen as bright spot in the image and are identified as active flames. Fires from much larger distances are visible to the thermal imager (detection range of the fire scales with the fire size, e.g. a 5×5 m$^2$ fire is detectable from ~700 m).

Figure 8:
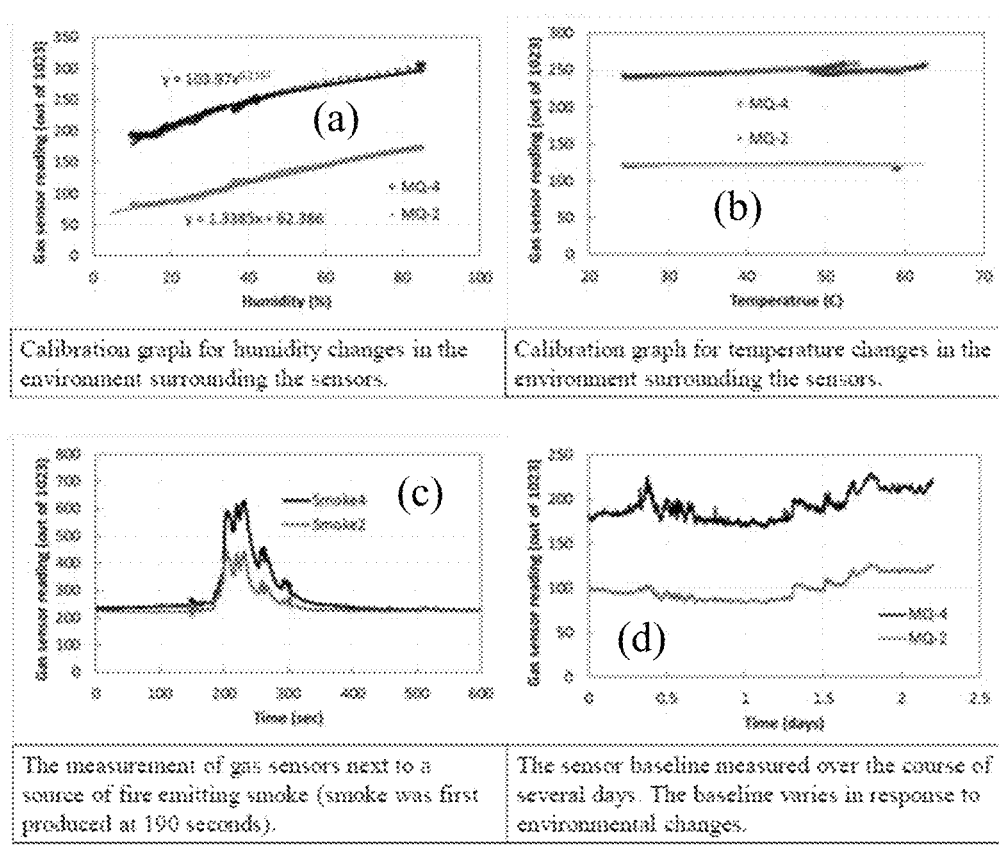

FIG. 8. Gas sensor calibration and baseline adjustment procedure. The readings of gas sensors to be used for smoke detection are adjusted by the processing unit (e.g. an Arduino microcontroller or other) according to calibration curves measured before the sensor is installed into the device. FIG. 8.*a* shows the calibration curve versus temperature, and 8.*b* versus humidity. FIG. 8.*c* shows typical readings of a gas sensor in the presence of smoke generated by a wood-burning fire. FIG. 8.*d* shows an uncalibrated baseline of sensor readings measured over several days. Calibration is required to adjust that baseline for the accurate sensor readings to be used for the epicenter location by the prediction algorithm. Simple fire detection can be done without calibration, but a higher threshold will be required in that case, while sensor reading adjustment will allow fire detection with lower concentrations of gases produced by a fire.

Figure 9:
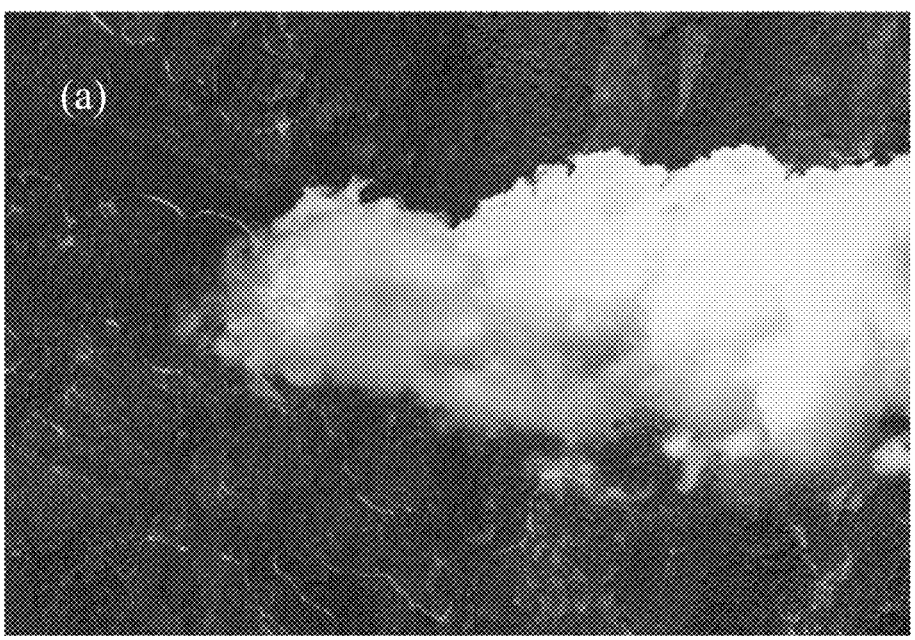
Figure 9:
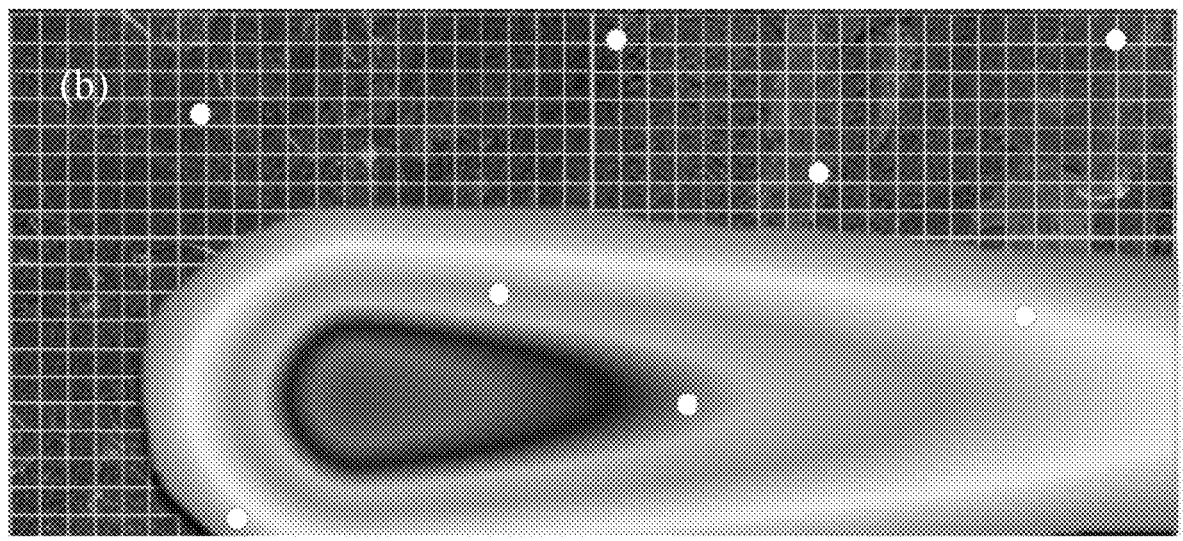

FIG. 9. The general principle of fire location reconstruction algorithm using gas sensor readings by the units for which the active flames are not visible yet. The smoke cloud distribution is modelled by the central processing computer, receiving data from distributed smoke sensors, as shown by white dots in FIG. 9.*b*. Calculation of best cloud distribution fitting the measured smoke distribution is used to determine the location of the fire. Landscape, wind direction and speed are taken into account.

Figure 10:
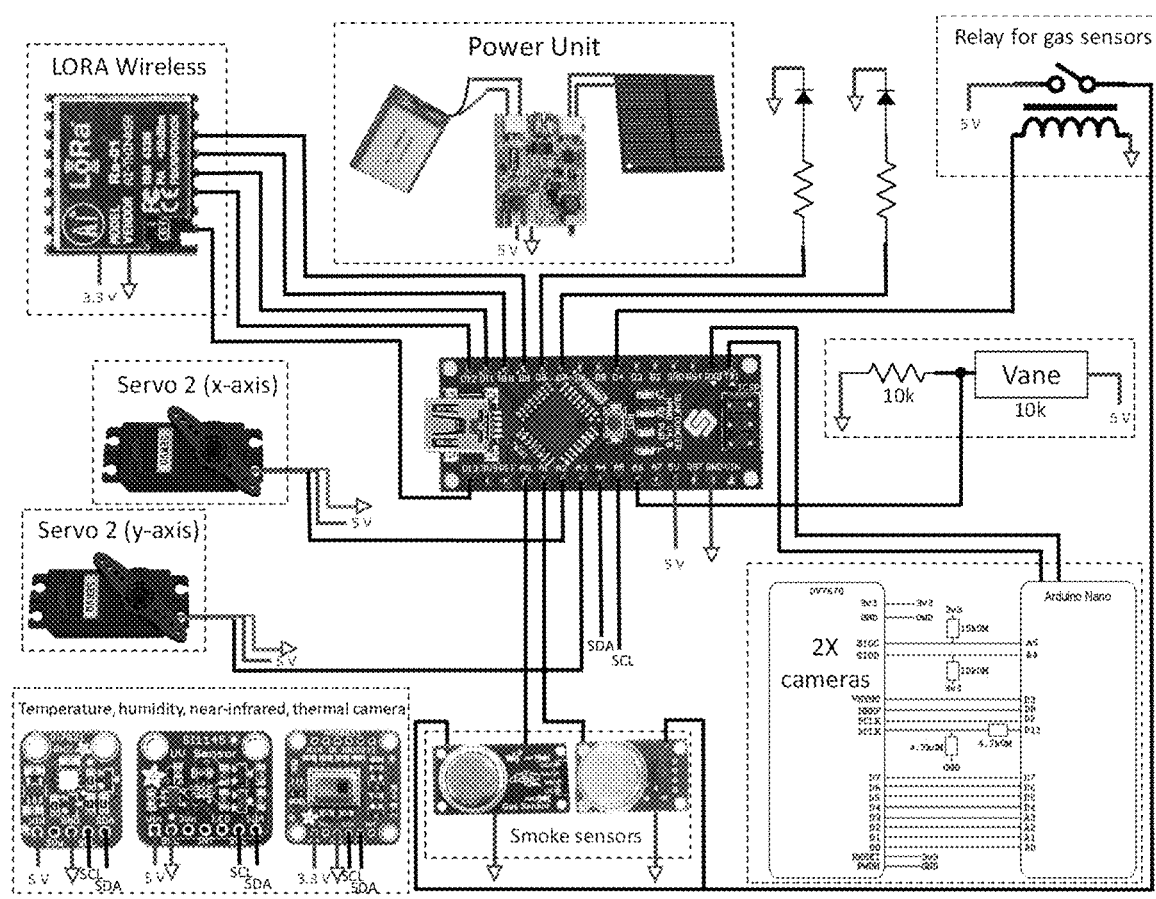

FIG. 10. Schematic diagram of one of the possible configurations of standalone detection unit. Various sensors can be omitted, if needed, for the reduction of the unit cost. Different types of microcontroller units can be used in the sensor, not limited to an Arduino as shown in the figure. A GPS sensors, which can be added for automatic location identification are not shown in the figure.

DETAILED DESCRIPTION OF THE INVENTION

Referring now to the invention in more detail, the system consists of two separate parts: a distributed network of data acquisition devices each monitoring the surrounding area (FIG. 1) and data processing algorithms. Each sensing unit can detect fires based on several methods of verification (FIGS. 2 & 3). Based on the readings of the sensor network, a reconstruction algorithm implemented in the control center can calculate the location of the fire even if the direct flames are not in the line of sight for any imaging sensor yet.

Figure 1:
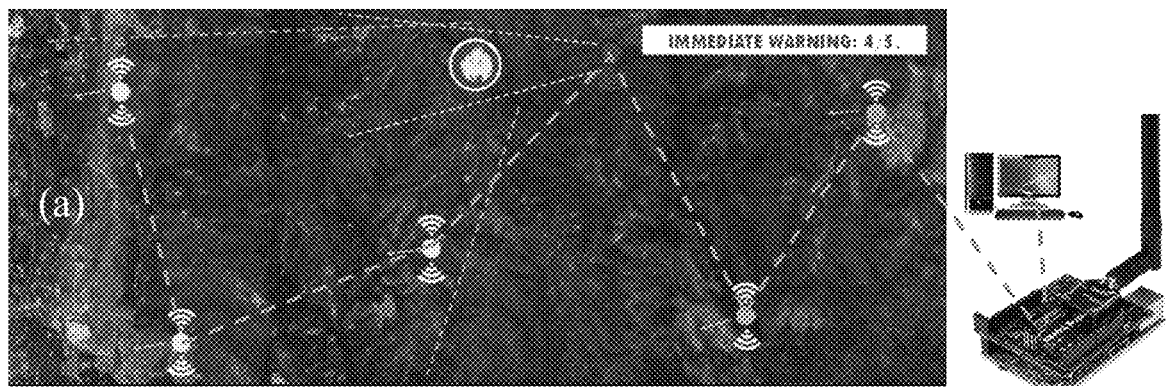
FIG. 1 is an illustration of one of the possible implementation of distributed sensor network. The individual units communicate through the wireless devices (which can be LoRa, for example) to the control center, periodically sending compressed or pre-processed results of sensor readings, FIG. 2.*a*. If a suspected fire is detected by a specific unit, the detailed readings of individual sensors as well as an actual image can be sent to the control center for further verification. One possible implementation of a distributed network of sensors can be mounted on the poles of transmission lines (FIG. 2.*b*), in order to detect fires caused by these lines, as is suspected to have been initiated in multiple wildfires in the past.
Figure 1:
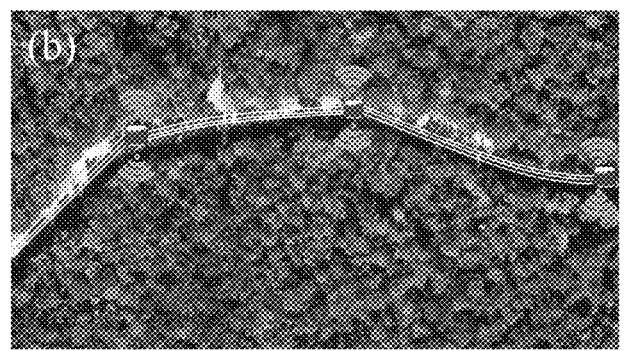
Figure 2:
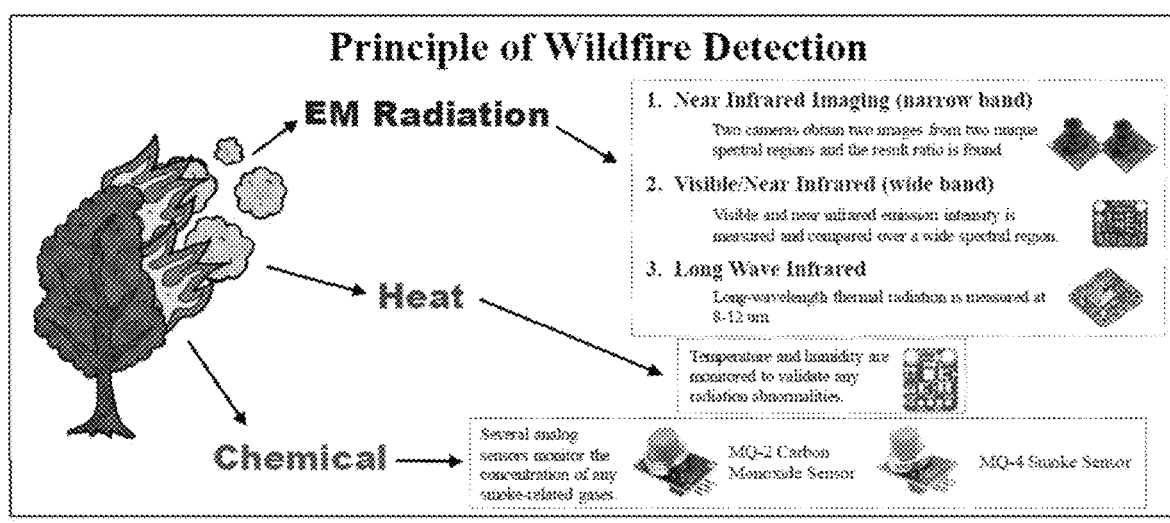
FIG. 2. Multivariable approach for fire detection. Each standalone sensor unit can contain all of or a subset of those sensors shown in the figure.

Referring now to the data acquisition device in more detail, each device may be solar powered and wirelessly connected to other data acquisition devices and/or directly to the central workstation (FIG. 1). Each device has a subset of components, consisting of a solar panel, a LoRa Wide Area Network communication device (or another long range wireless connection), a rechargeable battery, one or more smoke sensors, a temperature sensor, humidity sensor, and wind direction sensor, a thermal imager, one or more imaging cameras, near-infrared and visible photodiodes, narrow-band filters, an Arduino or other microcontroller, data recording media (e.g. SD card), and a GPS sensor (FIG. 3 showing a subset of sensors used in the standalone device).

The detection of a possible fire is performed by each of those sensors in parallel and readings of those sensors and/or a summary of pre-analyzed data is sent to the control center periodically through the wireless network, including through daisy chaining of other sensor units.

Description of Individual Detection Methods from which a Subset—or Complete List—is Implemented in the Sensor Unit.

Narrow band imaging in near infrared range, FIGS. 4, 5, where emission lines specific to fires exist. The goal of narrow-band infrared imaging is to differentiate light emission of fire flames from other sources of electromagnetic radiation within the observable field of view. Other potential sources of electromagnetic radiation include direct sunlight, sky illumination (scattered sunlight), car lights (LED, incandescent or gas discharge), street lamps, flashlights, and others. However, all of these sources lack the unique spectral features of fire, which has brighter emissions at unique spectral lines, e.g. K emission at 766 nm and 769 nm, FIGS. 5.*a* and 5.*b*. The sensor used in the present invention is not using $CO_2$ emission line at 4.3 μm, which is used in most Infrared fire detection cameras.

The images measured at the narrow spectral range (one image acquired at the fire emission spectral lines, such as 766 and 768 nm or others, FIG. 5.*a*, and another image is acquired at the wavelengths next to emission lines, FIG. 5.*b*). The two images are processed to eliminate all pixels in the image except for the pixels where signal from the emission line is present above the ambient light intensity (e.g. two images are subtracted, eliminating all the features not related to narrow band emission spectrum related to fire, FIG. 4). Since these two images can be taken by two separate cameras, normalization of images may be required before subtraction. One of the possible implementations of the normalization procedure is described below.

Image Processing for Flame Detection

1. Two images from two cameras with specific spectral filters (770 nm and 808 nm) are recorded.
2. Images are cropped to correspond to one exact direction (avoiding expensive alignment):

$I^{(1)}(i,j) = I_{Measured}(i - i_{shift}, j - j_{shift});$ $i \in [0,W]; j \in [0,H]; i_{shift} \in [0,240], j_{shift} \in [0,320]$ 3. Automatic contrast adjustment is compensated by the algorithm:

$I_{Measured} = I_{Real} \cdot A + B;$ $$C = \sum_i \sum_j R(i,j) \frac{1}{W+B} i \in [0, W]; j \in [0, H];$$

-continued $$I^{(2)}(i,j) = I^{(1)}(i,j) - \sum_i \sum_j I^{(1)}(i,j) \frac{1}{W+H};$$

4. A ratio of the two cropped and adjusted images is taken:

$$R(i,j) = \frac{I^{(2)}(i,j)[770 \text{ nm}]}{I^{(2)}(i,j)[808 \text{ nm}]};$$

5. Subtraction of images (comparing):

$$T(i,j) = I^{(2)}(i,j)[770 \text{ nm}] - C \cdot I^{(2)}(i,j)[808 \text{ nm}];$$

6. Thresholding (eliminating pixels without special lines):

$$T^*(i,j) = \max(T(i,j),0);$$

Comparison of radiation intensity at two wavelength ranges: visible versus near infrared, FIG. 6. Two dedicated diodes measure EM emission at two wavelength ranges: one diode has peak of spectral sensitivity in the visible range (e.g. 350-800 nm) and the other diode has the peak sensitivity in the near infrared (e.g. 600-1100 nm). The diode is pointed out to the center of the suspected fire, or a scan through the area is performed to cover wide field of view. The two measurements are then compared in order to find the ratio of infrared emission to visible emission. Fire can be detected if the measured ratio is substantially larger than the same ratio measured for the natural illumination (e.g. sunlight). The spectrum of fire emission is shifted towards near infrared wavelengths, therefore the ratio of two diode reading will be different for the fire, compared to all other natural emissions, FIG. 6.c.

Long-Wave Infrared (LWIR) Imaging, FIG. 7, is continuously conducted to detect any thermal abnormalities in the scanned area. Inexpensive LWIR sensor (e.g. thermopile sensor, such as Grid-EYE sensor, or other type of inexpensive infrared sensor) is used to scan the area for the existence of elevated temperature. When a pixel value in a measured image is determined to be higher than the ambient temperature (which is measured in adjacent pixels or is measured by a dedicated single pixel temperature sensor present in the unit), the thermal imaging algorithm raises the warning flag for the possible presence of a fire which is then cross correlated with the reading of all other components of the wildfire detection system. In one possible implementation, in case a hot pixel(s) is/are detected the sensor rotates towards the center of the detected area with increased temperature. This imaging method does not respond to direct sunlight due to its internal compensation algorithm. Many of those LWIR cameras which can be implemented in the present sensor are capable of seeing through thick smoke and fog.

The use of Gas sensor(s) is depicted in FIG. 8. One or several inexpensive gas sensing modules are used to monitor the presence of elevated concentration of specific gases (such as smoke). These sensor readings are first adjusted for the temperature and humidity to increase the accuracy of the measured gas concentrations. These units may consume a relatively large amount of power, therefore they are not turned on all the time, and can be powered up once in a given period of time (e.g. every 5 minutes in a normal mode of operation) to save power consumed by the fire detection module.

Temperature and humidity sensors are used to measure temperature and humidity are also measured by the fire detection device. These readings can also be used for the identification of fires as elevated temperature readings in a specific unit, compared to other sensors in the area, should indicate the possible presence of active fire.

After more than one sensors indicate the possible presence of a fire in the surrounding area, the fire detection module can send the image to the control center. The images are sent only in case of suspected fire in order to reduce the traffic on the wireless network. That image is used for the analysis by an artificial intelligence method implemented at the control center, which can be implemented in one particular instance as described below.

A Convolutional Neural Network (CNN) was designed to conduct deep-learning artificial intelligence classification of fire flame images in real-time. The neural network is trained on a dataset of relevant fire images, including wildfires, small and large flames, forests, landscapes, cities, sunsets and sunrises, and others.

Since all data acquisition devices are connected in a mesh network and transfer data between each other rather than directly to a central workstation, a fire image is always prioritized and is transmitted before any other signals. After receiving a suspected fire image, the classifier algorithm uses the pre-trained model to calculate a percentage probability of the image containing a fire flame. The degree of warning is shown to the user accordingly.

With reference to FIG. 9, the invention is capable of determining the location of fire even if it is not yet seen by any units with an imaging camera. Here the location of fire is reconstructed from the readings of gas sensors (e.g. smoke sensors) implemented in units dispersed in the area.

Each data acquisition device placed throughout the field (white dots in image of FIG. 9.b) continuously measures smoke content and sends data periodically to the control center. The algorithm is employed at a central workstation, which receives data from all sensors in the entire area. The dedicated algorithm is developed here to calculate the location of fire based on the readings of gas, temperature, humidity and wind direction (and possibly, not absolutely required wind speed) sensors.

Reconstruction of fire location from the measured smoke distribution: The "smoke cloud" produced by the fire epicenter is modeled in accordance to the wind speed, wind direction, and estimated size of the smoke cloud. The cloud is modeled by an equation representing smoke cloud propagating in the field. The amount of smoke produced by the flame (concentration) is estimated according to the cloud size and wind speed.

The sensor with the maximum smoke reading is determined. A modelled smoke concentration field is chosen in accordance to the smoke cloud size and shape, with its center at the sensor with maximum concentration determined earlier. The testing field is divided into an array of cells, each of which is a potential fire epicenter in the region. The number of cells is determined by the fire detection resolution desired by the user. The center of a virtual smoke cloud is placed at each cell, and each location is then checked as a potential fire epicenter.

Using the method of least squares regression, the algorithm runs through all cells in the region. At each cell, a smoke cloud is modeled according to hypothesized model of the cloud. Then, the theoretical value calculated for each sensor is subtracted from its actual measured value, and all differences are squared and then added. The most probable fire location is determined by the least squares value, meaning that the modelled smoke cloud fits the real smoke shape the closest.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed in the present patent application:

1. An automated system for monitoring a large area and detecting dangerous fire conditions as they develop, including:
   a plurality of data acquisition assemblies directed to surveil the area, each including a plurality of sensors adapted to detect emissions that may be indicative of a dangerous fire condition;
   said data acquisition assemblies further including communications devices for mutual transfer of the output signals of said sensors;
   an artificial intelligence network for receiving said output signals of said sensors and analyzing said output signals to determine if a dangerous fire condition is occurring;
   wherein each of said data acquisition assemblies includes at least one pair of dedicated photodiodes operating in the visible spectrum and the near infrared spectrum for detecting the ratio of visible emissions to infrared emissions in at least a portion of the area being monitored.

2. The system for detecting dangerous fire conditions of claim 1, wherein each of said data acquisition assemblies includes at least one smoke sensor, and a wind sensor to detect wind speed and direction.

3. The system for detecting dangerous fire conditions of claim 2, wherein each of said data acquisition assemblies includes an ambient air temperature sensor and a humidity sensor.

4. A method for monitoring a large area and detecting dangerous fire conditions as they develop, including the steps of:
   initially imaging the area in two or more different near-infrared bands;
   calculating the ratio of the near-infrared images to detect any potential fire emissions and eliminate spurious non-fire sources;
   surveilling any detected potential fire emissions using sensors operating in the visible band and near-infrared band;
   calculating the ratio of the visible and near-infrared emissions to determine if a potential fire condition is being detected;
   surveilling any detected potential fire emissions using a long-wave infrared thermal imaging camera to detect a dangerous fire condition.

5. The method for monitoring and detecting dangerous fire conditions of claim 4, further including the step of sensing wind speed and direction, and further including the step of sensing smoke density, and calculating the source of detected smoke to locate a dangerous fire condition.

6. The method for monitoring and detecting dangerous fire conditions of claim 5, further including the step of providing a plurality of data acquisition assemblies dispersed throughout the area being monitored, each equipped to carry out all or a subset of the enumerated method steps, and each including wireless communications devices to create a mesh network among said data acquisition assemblies, and further calculating the fire location based on iterative reconstructive algorithm using the smoke sensor readings and wind speed and direction readings of all said data acquisition assemblies.

7. The method for monitoring and detecting dangerous fire conditions of claim 4, further including the step of providing a plurality of data acquisition assemblies dispersed throughout the area being monitored, each equipped to carry out all of the enumerated method steps, and each including wireless communications devices to create a mesh network among said data acquisition assemblies.

8. The method for monitoring and detecting dangerous fire conditions of claim 7, further including the step of providing an artificial intelligence network connected to said mesh network to perform the calculations of the method and analyze potential fire conditions and detect a dangerous fire condition and minimize false positive alarms.

9. The method for monitoring and detecting dangerous fire conditions of claim 8, wherein each data acquisition assembly is assigned a unique geographical location identifier which is transmitted to the other data acquisition assemblies and said artificial intelligence network;
   when any data acquisition assembly detects two potential fire conditions, the data from that sensor is prioritized in transmission throughout said mesh network.

10. The method for monitoring and detecting dangerous fire conditions of claim 9, in which when any data acquisition assembly detects two potential fire conditions, the other data acquisition assemblies may be aimed toward the potential fire conditions source.

* * * * *